Patented Feb. 11, 1947

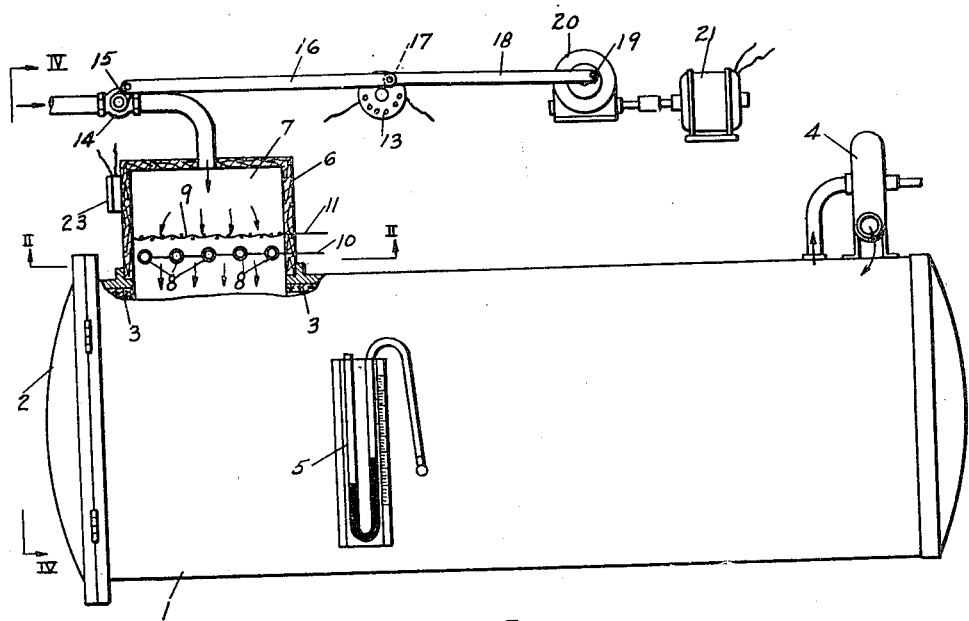
Fig. I
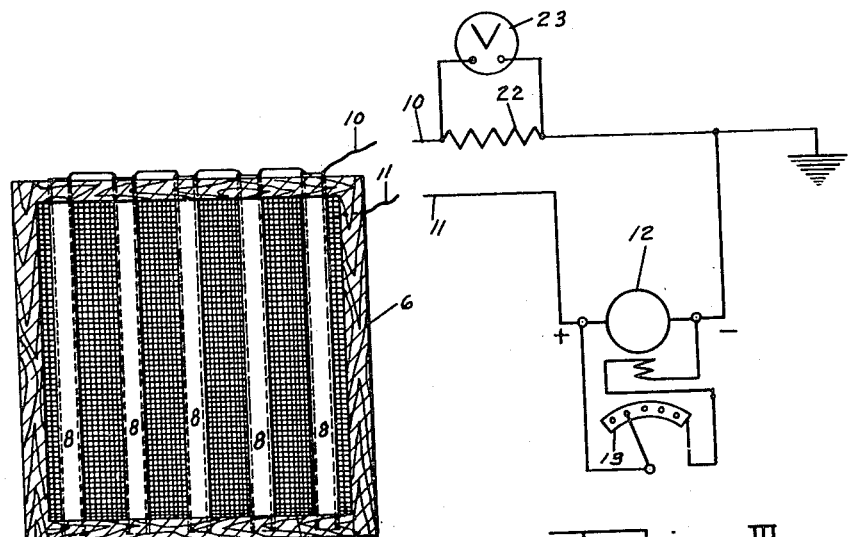
Fig. II
Fig. III
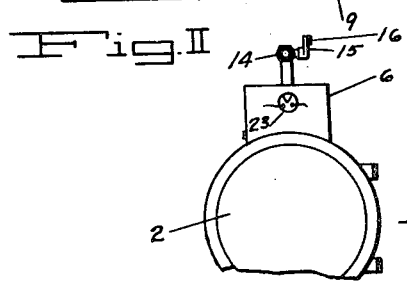
Fig. IV

2,415,659

UNITED STATES PATENT OFFICE 2,415,659

THERAPEUTIC METHOD AND MEANS

Van H. Steel, Portland, Oreg.

Application September 30, 1941, Serial No. 413,019

7 Claims. (Cl. 128—190)

This invention relates to therapeutics, and it relates particularly to the formation of activated or atomic oxygen and the application thereof to pathological conditions that are not readily accessible. This application is a continuation in part of my co-pending application for Letters Patent of the United States for a Method and means of purifying air, Serial No. 410,787, filed September 13, 1941, which matured into Patent No. 2,343,338, issued March 7, 1944.

It has heretofore been known that the application of an electrical voltage to suitable electrodes arranged in air at atmospheric pressure would result in the formation of ions by collision of free electrons with air molecules. It has, however, been commonly supposed that this ionization by collision did not occur in substantial amounts at a voltage much below that required for the formation of visual corona. Inasmuch as ozone, and possibly some nitrogen compounds that are highly deleterious when breathed, are formed at or perhaps somewhat below the visual corona voltage, it has not heretofore been deemed advisable to employ ionization by collision in therapeutic devices.

In the apparatus hereinafter described, however, a substantial amount of ionization by collision will occur at voltages well below the visual corona point and well below the voltage required to form ozone or other substances that may be harmful in high concentrations. The resulting positive oxygen ions, that is, oxygen molecules that have had one of their electrons removed by collision with a free electron moving at high velocity under the force of the moderately high voltage, have considerable therapeutic value in the high concentrations attainable as described hereinafter. Furthermore, and possibly of greater value, oxygen molecules will be dissociated and atomic oxygen in forms hereinafter discussed will be formed coincidentally with the ionization by collision.

The therapeutic value of nascent atomic oxygen is generally recognized, but heretofore no way has been known whereby an adequate, continuous supply of it might be made available at the exact point where it was needed. For example, hydrogen peroxide is a useful bactericide due to the atomic oxygen it releases when it comes in contact with a protein, but it is of limited value because, when it is applied to a wound, it releases all of its nascent oxygen at once and it is then useless. To constantly replenish the supply of hydrogen peroxide would interfere with the healing of the wound.

The principal object of my invention is to provide means for ionizing air by the collision of its molecules with electrons moving at high velocity under the influence of a moderately high voltage, thus forming atomic oxygen coincidentally but not forming ozone or other potentially harmful substances, and for effectively applying the air thus treated to a patient.

The utilization of the atomic oxygen formed as herein described is extremely difficult because of its short life. The oxygen atoms tend to combine with each other, reverting back to molecular oxygen, before they have an opportunity to combine with the substance to the oxidized. However, some oxygen atoms will be electrically charged by the process of ionization by collision and the life of these may be prolonged somewhat by properly arranging the therapeutic apparatus. Moreover, the oxygen molecules which become positive ions upon losing an electron are valuable bactericides, and their life may likewise be prolonged substantially.

A further object of my invention therefore is to provide means whereby the life of electrically charged particles, and particularly of positively charged oxygen atoms and molecules, formed by ionization of air by collision will be prolonged in order that they may effectively be utilized for therapeutic purposes.

It is desirable to facilitate the mechanical union of the treated air with the object to be treated. For example, the sinus passageways of the head communicate with the nasal passages ordinarily. In case of inflammation, these communicating passages become closed, or partially closed, so that drainage is prevented. The interior cavity contains air or other gas released by the action of bacteria, and this gas will be under pressure corresponding to the external atmospheric pressure. If the atmospheric pressure is reduced from its ordinary value of about fifteen pounds per square inch to, say, thirteen pounds per square inch, the gas within the sinus will expand and tend to force the liquid exudate outward through the communicating passage to the nasal passages. Then, after sufficient time has elapsed for the gas pressure within the sinus to be reduced substantially to the reduced atmospheric pressure, the atmospheric pressure may be increased to its normal value whereupon outside air will tend to be forced into the sinus.

In this way, drainage of the inflamed sinus will be achieved, which is, in itself, a greatly desired result. Furthermore, if the oxygen of the air entering the nasal passages be ionized and dissociated, it will serve as a bactericide and thus reduce the inflammation at the juncture of the nasal passages and the sinus passages, tending to keep the sinus passages open and promoting drainage. The ionized air may reach the interior of the sinus, there to reduce inflammation, in addition to its function of promoting drainage.

A further object of my invention, therefore, is to provide means whereby the pressure of air surrounding an object may be varied periodically thereby causing alternate influxes and effluxes of said air into and out of regions that otherwise would not readily be reached by it.

In order that the means for ionizing air, hereinafter described, may be placed near the patient or object being treated so that atomic oxygen produced coincidentally with the ionization may be utilized despite its short life, it may be desirable to place the ionizer in the region in which the pressure of the air is being varied. Inasmuch as the ionizer will function differently with different air pressures, it will then become necessary to vary the voltage of the ionizer in synchronism with the variation in air pressure.

Thus, a further object of my invention is to provide means for simultaneously varying the voltage of an ionizer and the pressure of the air surrounding the ionizer in such a way as to maintain a substantially unvarying ionizing effect.

Further objects and details of my invention will be disclosed with reference to the accompanying drawing, in which:

Fig. I is a side elevation of apparatus embodying my invention, portions thereof being shown broken away;

Fig. II is a section taken on the line II—II in Fig. I;

Fig. III is a schematic electrical diagram of the electrical portions of the structure illustrated in Fig. I; and Fig. IV is an end view taken on the line IV—IV in Fig. I.

Decompression chamber 1 is provided with a hinged door 2. This chamber may be made of sheet steel, if desired, and I prefer to provide it with a cork lining 3 to minimize the loss of ions by diffusion to the walls. Blower 4, or other suitable pump, which may be driven by any suitable source of power not shown, is adapted to withdraw air from chamber 1. Although I refer to chamber 1 as a decompression chamber, it is not to be deemed limited to use with any particular pressures; its function is to provide air pressure that may be controlled and varied as desired. The pressure within chamber 1 may be measured by gauge 5 connected thereto.

I have illustrated a decompression chamber adapted to receive the whole body of a patient. This arrangement is particularly suitable for treating respiratory disorders, in which case the patient may be arranged with his head immediately under ionizer 6 if it is desired that he breathe atomic oxygen; otherwise his head may be placed at the end of chamber 1 opposite door 2. But it may be more convenient to utilize a smaller chamber adapted to enclose only a part of the patient's body; this will be particularly desirable where it is not necessary for the patient to breathe the ionized air, in which case much stronger ionization may be used. After reading the present disclosure, an ordinarily skilled person will be able to construct modified chambers adapted to enclose only part of the body, providing well-known sealing members to prevent leakage of air where the edge of the chamber joins the patient's body. Hence these modified chambers are not illustrated herein.

Ionizer 6 comprises a chamber 7, the walls of which I prefer to make of wood, and two sets of electrodes 8 and 9. Electrodes 8 may consist of a plurality of brass tubes arranged close enough together to prevent persons being shocked by coming in contact with electrodes 9. These tubes 8 should all be connected together by a suitable electrical conductor 10, and I prefer to connect electrodes 8 to the metal wall of chamber 1 and to ground.

Electrode 9 may comprise a wire screen made preferably of rather small wires, and it should be connected by wire 11 to the positive side of generator 12 having a field rheostat 13 for varying its voltage. When the voltage thus impressed across electrodes 8 and 9 is increased to a value corresponding to a voltage gradient between them of about 10,000 volts per centimeter, the free electrons produced at the rate of several per second per cubic centimeter in indoor air by cosmic rays and by other agencies, will begin to be accelerated between collisions with air molecules to sufficient velocity to ionize oxygen molecules. In other words, with this voltage gradient a few electrons will attain a sufficient velocity to remove electrons from the oxygen molecules with which they collide, and the resulting free electrons will free other electrons so that an avalanche of free electrons will move rapidly toward the positive electrode 9.

If the voltage be further increased, the number of free electrons produced will be increased not only because a greater percentage of them will ionize by collision, but also because the ionization by collision resulting from the initial free electrons will cause other free electrons to be released at or near the cathode (negative electrode 8) and these in turn will cause fresh avalanches of electrons. If the voltage be still further increased, the number of secondary avalanches will be increased and the ionization process will persist even if no free electrons are formed between the electrodes, and a further increase in voltage will result in visible corona or a spark.

However, I prefer not to raise the voltage to such an extent that ionization by collision proceeds as a self-maintaining process, lest objectionable quantities of ozone and nitrogen compounds be produced. The number of free electrons produced by cosmic rays will usually be sufficient when multiplied in avalanches to result in adequate ionization, and minute dust particles accumulating on the cathode will so concentrate the electrostatic field that free electrons will be produced there. The latter effect may be increased by adding more dust particles, if desired.

Thus, I prefer to apply a voltage to electrodes 8 and 9 such that some of the free electrons that "trigger" avalanches will be produced independently of the avalanches themselves. This is known to physicists as the Geiger counter regime. However, a somewhat higher voltage may be utilized than with a Geiger counter since resolving power is not required; if the avalanches from successive triggering electrons overlap somewhat, no harm will be done.

I prefer to utilize electrodes of sufficient area so that enough ionization of oxygen will occur at a voltage gradient below that required to ionize nitrogen molecules. Because ionization by collision begins so gradually, as the voltage is increased, it is difficult to determine the exact point where it begins. Seemingly, in air at atmospheric temperature and pressure oxygen will begin to ionize at about 10,000 volts per centimeter, while nitrogen does not begin to ionize until a gradient of about 12,500 volts per centimeter is reached. However, if the latter figure is somewhat exceeded, only a little nitrogen will be ionized.

I prefer not to ionize nitrogen for two reasons. First, it may result in the formation of nitrogen compounds that would be objectionable, although seemingly very little of these compounds will be formed at voltages below the visual corona voltage. Second, the ionization of nitrogen would result in large numbers of free electrons being produced, since there is a great deal more nitrogen in air than oxygen, and I deem the presence of free electrons in the ionizer to be objectionable for the following reason:

The positive molecular oxygen ions resulting from the removal of an electron from an oxygen molecule are more active chemically than neutral oxygen molecules because, when oxygen combines with another substance, a migration of electrons takes place and this migration is facilitated by the positive charge on the oxygen molecules. Thus, positive oxygen ions have greater bactericidal power than ordinary oxygen. Furthermore, the positive ions have a direct effect on the human body that may be remedial, although they must be carefully controlled since too large doses of positive ions are harmful. Thus, positive ions cause increased body metabolism and, in humans, they have been observed to cause nosebleed.

The life of positive molecular ions is terminated, in the sense that their charges are neutralized so that they are no longer ions, largely by contact with other negative ions. Electrons rarely unite with positive ions to neutralize their charges, but electrons readily combine with neutral oxygen molecules to form negative oxygen ions which attract and neutralize the positive ions. Thus, the life of the positive molecular oxygen ions will be longer if fewer electrons are present, and there will be fewer free electrons if nitrogen is not ionized.

Positive electrode 9 will powerfully attract electrons, and it will quickly remove most of them from the ionizer. This electrode will remove more electrons because it is in the form of a screen than would other forms of electrodes. Also, the electrons are moved by the electrostatic field in a direction opposite to the flow of air due to blower 4 so that the electrons are separated from the positive ions not only by the electric force tending to move them in opposite directions, but also by the air current carrying the positive ions. It will be understood that electrons are small compared to molecules and that they move very rapidly in an electrostatic field. Thus, electrons have a mobility of about 10,000 centimeters per second in a voltage gradient of 1 volt per centimeter, whereas positive oxygen ions have a mobility of between 1 and 2 centimeters per second in the same field.

With these precautions against the formation of negative ions by free electrons, the life of the positive oxygen ions may be extended to a minute or more, which is desirable for therapeutic purposes. Without them, the life of the positive ions would be terminated earlier by uniting with negatively charged particles. Similarly, the removal of a substantial number of electrons will prolong the life of oxygen atoms, and this result is highly desirable. Thus, if electrons are removed so that most of the oxygen atoms present are positively charged, these atoms will repel each other because of their electrical charges and they will unite to form molecular oxygen more slowly. Removal of electrons will also prevent neutral oxygen atoms acquiring charges, which is highly desirable, since neutral atoms normally survive longer than charged ones.

As a free electron moves through space under the force of an electrostatic field, it will collide with molecules at varying intervals. If the path between collisions be sufficiently long and the voltage sufficiently high so that the electron is accelerated freely through about 12.5 volts, it will have enough energy to dislodge an electron from an oxygen molecule with which it happens to collide to form an ion. To ionize a nitrogen molecule, it must have the energy acquired by free acceleration through about 15.5 volts.

Now an electron that has been accelerated through a lower voltage will serve to dissociate an oxygen molecule into atoms, the value of the energy required being estimated at from 5 to 7 volts by different observers. Thus, dissociation of oxygen will occur at a lower voltage than will ionization, provided free electrons are present. I prefer to utilize a voltage somewhat higher than that necessary to ionize oxygen by collision in order that enough free electrons shall be produced to dissociate a substantial amount of the oxygen, the resulting nascent atomic oxygen being a valuable oxidizing agent.

The nascent oxygen atoms thus formed may be uncharged, in which case they will not be attracted by charged particles or by the electrostatic field. Their life will be terminated when they unite with another oxygen atom, unless they combine chemically with some other substance first.

Other of the oxygen atoms may have positive charges, either because the molecules from which they were formed had positive charges or because they have lost an electron by collision with a fast moving electron. These positive oxygen atoms will tend to be attracted to negative particles and thus destroyed, and their life will be prolonged like that of positive molecular oxygen molecules by minimizing the number of negative particles present.

There will also be formed metastable nitrogen atoms, which are uncharged atoms having an electron partly dislodged. This electron will readily be freed if the metastable atom strikes a metal surface, such as cathode 8. To achieve ionization by collision with voltages low enough to assure that no harmful substances will be formed, it is desirable that the metastable atoms produced by an avalanche of electrons moving toward the positive electrode shall move toward the cathode in order that an occasional one of these metalstables may strike the cathode and release an electron which may start a new avalanche. This purpose is achieved in my invention because the air stream moves from the positive electrode to the cathode, carrying metastables with it. If the air did not move, metastables would reach the cathode only by diffusion.

Another source of triggering electrons is the bombardment of the cathode by positive ions, which are attracted to the cathode by an electric force. The movement of these positive ions toward the cathode is also facilitated by the air stream.

Valve 14 operable through lever arm 15 serves as a choke for the air entering ionizing chamber 7. If this valve be partially closed, blower 4 will reduce the pressure in chambers 1 and 7 to a greater extent than it will if the valve be opened wider. It will be apparent that, if increased pressure is wanted in the chambers instead of a vacuum, this result will be achieved if the positions of blower 4 and valve 14 be interchanged, the blower being properly arranged to blow air into chamber 7 and the valve then serving as a release valve instead of a choke.

As mentioned, it is desirable to reduce the voltage applied to electrodes 8 and 9 when the air pressure in chamber 7 is reduced. To this end, lever arm 15 on valve 14 is connected to lever arm 17 on field rheostat 13 by connecting rod 16 which is driven by pitman 18 from eccentric pin 19 on speed reducer 20 driven by motor 21. Thus, valve 14 and rheostat 13 oscillate synchronously and cause the pressure and voltage, respectively, to vary. I prefer to provide a motor and speed reducer such that one cycle of pressure change will be completed in about ten minutes. More rapid changes may be uncomfortable for the patient, causing undue pressure on his eardrums, for example.

It is desirable that some means for indicating the activity of the ionizer be provided in order that favorable conditions may be reproduced when desired. This may be achieved by measuring the current flowing in wires 10 and 11, which is also the current flowing through the air between electrodes 8 and 9. Inasmuch as this current will ordinarily be very small, possibly only a small part of a millionth of an ampere, it can be most readily measured by inserting a high resistance 22 in wire 10, and then connecting voltmeter 23 which may be of the well known vacuum tube type across said resistance. It should not be inferred from the small value of current mentioned that the ionization effects produced by ionizer 6 are not substantial. The small current mentioned represents many millions of electrons per second passing through the air between electrodes 8 and 9.

The operation of my invention is as follows, assuming a patient is to be treated for sinus inflammation. The patient is placed in chamber 1 with his head preferably as close as possible to electrodes 8. The voltage applied to electrodes 8 and 9 is adjusted by rheostat 13 until a small current flows in wire 10 as indicated by voltmeter 23. If desired, the ion concentration in chamber 1 may be counted by means known to physicists and voltmeter 23 thus calibrated in terms of ion concentration. Voltmeter 23 may then be used to adjust the ionization in chamber 1 to a value only slightly higher than that normally existing in the atmosphere, if desired. In successive treatments the ionization activity as indicated by voltmeter 23 may be increased as desired by rheostat 13. The patient will detect ozone by its odor before harmful concentrations of ozone are reached.

It should be understood that my invention produces two independent results. First, it acts as a bactericide, and as such it is equally effective whether the object to be sterilized is a portion of the body such as a mucous membrane, or a piece of cloth. Elastic bandages and other objects that should not be heated to a high temperature may advantageously be sterilized by placing them in chamber 1 for a sufficient length of time. The varying air pressure within said chamber will be effective to cause the ionized air and activated oxygen to penetrate the pores of the material in the same way that it is effective to cause these bactericidal agencies to penetrate the sinus passages and membranes.

Second, the activated oxygen and positive molecular oxygen ions have a direct effect upon the body, producing increased metabolism, for example.

Although I have described a generator 12 whose voltage is controlled by a field rheostat 13, it will be understood that any other suitable source of electric power may be used. For example, alternating current may be converted to direct current by means of a vacuum tube rectifier. In this case the voltage might be controlled by a tapped switch on the primary of the transformer supplying the high voltage, instead of by rheostat 13. These expedients being well known are not illustrated herein.

The expression "activate oxygen" as used herein is intended to include oxygen molecules or atoms to which energy has been added either to move an electron to an outer orbit or to remove the electron completely from the influence of its nucleus. I understand a metastable atom to be one to which energy has been added to move an electron to an outer orbit where it reaches a more or less stable state of equilibrium, the electron being rather loosely bound, however, so that it may readily be released upon colliding with a metal surface.

It will be understood, of course, that I do not use the word bacteria herein in its strictly technical sense, but that I intend it to include various other microorganisms.

I claim:

1. In therapeutic apparatus comprising a chamber adapted to contain a stream of air and an ionizer employing an electrical voltage, the combination therewith of a rotatable valve for varying the air pressure within said chamber, a rotatable voltage control for varying said electrical voltage, and a single power driven reciprocating member operatively connected to said valve and to said voltage control for actuating said valve and said control in synchronism.

2. Therapeutic apparatus comprising a container for encompassing a member to be treated, an ionizer for activating a quantity of oxygen-containing fluid, means for directing the quantity of activated oxygen thus provided into and thru said container, means for varying the pressure of said fluid while in said container, and means, operatively connected with the fluid pressure varying means, for varying the voltage in said ionizer in synchronism with the pressure changes in said container.

3. In apparatus for reducing bacterial activity on a porous object harboring bacteria, the combination which comprises a chamber adapted to encompass a stream of air, an ionizer for activating oxygen of said air, and automatically operable means for varying the pressure of the air within said chamber through recurring cycles and within predetermined limits.

4. In therapeutic apparatus for treating a member having porous cavities, the combination which comprises a chamber adapted to encompass a stream of air in contact with said member, an ionizer for activating oxygen of said air, said ionizer being positioned on the up-stream side of said member, and automatically operable means for varying the pressure of the air within said chamber within predetermined limits through successive cycles of pressure variation thereby to cause said activated oxygen to penetrate said porous cavities.

5. Therapeutic apparatus comprising a chamber adapted to encompass a stream of air, means for varying the air pressure within said chamber through recurring cycles, an ionizer employing an electrical voltage adapted to activate the oxygen of the air within said chamber, and means operatively connected to said first mentioned means for automatically varying the voltage of said ionizer in synchronism with the pressure variations within said chamber whereby a substantially constant degree of activation of oxygen of the air within said chamber is produced throughout said cycles.

6. The method of reducing bacterial activity on a porous object harboring bacteria which comprises enclosing said object within a treating chamber, while so enclosed directing into said chamber a stream of air substantially free from ozone but containing a substantial amount of activated oxygen, and automatically varying the relative rates of ingress and egress of air to and from said chamber for producing through recurring cycles and within predetermined limits variations of the pressure of said air within said chamber to cause a penetration of said activated oxygen into said porous object.

7. The method of reducing bacterial activity on a porous object harboring bacteria which comprises enclosing said object within a treating chamber, while so enclosed introducing into said chamber a continuous stream of air substantially free of ozone but containing a substantial amount of activated oxygen, and automatically varying through recurring cycles and within predetermined limits the air pressure within said chamber to cause a penetration of said activated oxygen into said porous object.

VAN H. STEEL.

REFERENCES CITED

The following references are of record in the file of this patent:

UNITED STATES PATENTS

| Number | Name | Date |
| --- | --- | --- |
| 2,132,539 | McRae | Oct. 11, 1938 |
| 2,140,898 | Collens et al. | Dec. 20, 1938 |
| 743,432 | Blackmore et al. | Nov. 10, 1903 |
| 1,773,220 | Credicott | Aug. 18, 1920 |
| 1,714,562 | Keiser | May 28, 1929 |
| 2,235,138 | Billetter | Mar. 18, 1941 |
| 2,132,539 | McRae | Oct. 11, 1938 |
| 1,937,536 | Steerup | Dec. 5, 1933 |
| 1,728,333 | Crowther | Sept. 17, 1929 |

FOREIGN PATENTS

| Number | Country | Date |
| --- | --- | --- |
| 777,435 | France | July 22, 1935 |
| 429,352 | Britain | May 28, 1935 |
| 491,523 | Germany | Feb. 11, 1930 |